US008160942B2

(12) United States Patent
Miller et al.

(10) Patent No.: US 8,160,942 B2
(45) Date of Patent: Apr. 17, 2012

(54) BILLING WORKFLOW SYSTEM FOR CREDITING CHARGES TO ENTITIES CREATING DERIVATIVES EXPOSURE

(75) Inventors: Harold Miller, Mill Hill (GB); Julian Mark Toghill, Winchester (GB); Tuan Pham, Bishop Stortford (GB)

(73) Assignee: JP Morgan Chase Bank, New York, NY (US)

( * ) Notice: Subject to any disclaimer, the term of this patent is extended or adjusted under 35 U.S.C. 154(b) by 105 days.

(21) Appl. No.: 12/839,891

(22) Filed: Jul. 20, 2010

(65) Prior Publication Data
US 2010/0287082 A1 Nov. 11, 2010

Related U.S. Application Data

(63) Continuation of application No. 10/774,357, filed on Feb. 6, 2004, now Pat. No. 7,814,003.

(60) Provisional application No. 60/529,498, filed on Dec. 15, 2003.

(51) Int. Cl.
*G06Q 40/00* (2012.01)
(52) U.S. Cl. ............... 705/34; 705/30; 705/38
(58) Field of Classification Search .......... 705/30, 705/34, 38
See application file for complete search history.

(56) References Cited

U.S. PATENT DOCUMENTS

| | | | |
|---|---|---|---|
| 2,005,003 A | 6/1935 | Patton et al. | |
| 3,653,480 A | 4/1972 | Yamamoto et al. | |
| 3,938,090 A | 2/1976 | Borison et al. | |
| 4,050,375 A | 9/1977 | Orleans | |
| 4,141,078 A | 2/1979 | Bridges et al. | |
| 4,205,780 A | 6/1980 | Burns | |
| 4,264,808 A | 4/1981 | Owens et al. | |
| 4,321,672 A | 3/1982 | Braun et al. | |
| 4,385,285 A | 5/1983 | Horst et al. | |
| 4,396,985 A | 8/1983 | Ohara | |
| 4,443,027 A | 4/1984 | McNeely et al. | |
| 4,453,074 A | 6/1984 | Weinstein | |
| 4,454,414 A | 6/1984 | Benton | |
| RE31,692 E | 10/1984 | Tyburski et al. | |
| 4,495,018 A | 1/1985 | Vohrer | |
| 4,575,621 A | 3/1986 | Dreifus | |

(Continued)

FOREIGN PATENT DOCUMENTS

EP 0421808 4/1991

(Continued)

OTHER PUBLICATIONS

Alabama Department of Revenue Selects Unisys for Imaging Solution to Speed Tax Returns, Bus. Wire, Sep. 6, 1995.

(Continued)

*Primary Examiner* — Thomas Dixon
*Assistant Examiner* — Gerald Vizvary
(74) *Attorney, Agent, or Firm* — Lowenstein Sandler PC

(57) ABSTRACT

An automated billing workflow system receives credit valuation adjustment (CVA) amounts associated with derivatives trades. The automated billing workflow system interacts with an Accounting System in order to make appropriate Profit and Loss (P&L) entries for the CVA amounts. The CVA amounts are billed to the business units which actually created the risk. The invention employs a plurality of Workflow Queues. As an item makes it way through the billing workflow, it may be slotted in one or more of these queues where further action will take place.

17 Claims, 3 Drawing Sheets

U.S. PATENT DOCUMENTS

| | | |
|---|---|---|
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Van Horn |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | LaLonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Kleese |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,729,594 A | 3/1998 | Klingman |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson et al. |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |

| | | | | | | |
|---|---|---|---|---|---|---|
| 5,802,498 | A | 9/1998 | Comesanas | 6,041,312 A | 3/2000 | Bickerton et al. |
| 5,802,499 | A | 9/1998 | Sampson et al. | 6,041,315 A | 3/2000 | Pollin |
| 5,819,238 | A | 10/1998 | Fernholz | 6,044,362 A | 3/2000 | Neely |
| 5,826,241 | A | 10/1998 | Stein | 6,045,039 A | 4/2000 | Stinson et al. |
| 5,826,245 | A | 10/1998 | Sandberg-Diment | 6,047,261 A | 4/2000 | Siefert |
| 5,832,090 | A | 11/1998 | Raspotnik | 6,052,674 A | 4/2000 | Zervides et al. |
| 5,832,447 | A | 11/1998 | Rieker | 6,058,379 A | 5/2000 | Odom et al. |
| 5,832,457 | A | 11/1998 | O'Brien | 6,058,380 A | 5/2000 | Anderson et al. |
| 5,832,460 | A | 11/1998 | Bednar | 6,058,381 A | 5/2000 | Nelson |
| 5,832,463 | A | 11/1998 | Houvener et al. | 6,061,665 A | 5/2000 | Bahreman |
| 5,832,464 | A | 11/1998 | Houvener et al. | 6,064,764 A | 5/2000 | Bhaskaran et al. |
| 5,832,488 | A | 11/1998 | Eberhardt | 6,064,987 A | 5/2000 | Walker et al. |
| 5,835,580 | A | 11/1998 | Fraser | 6,065,675 A | 5/2000 | Teicher |
| 5,835,603 | A | 11/1998 | Coutts | 6,067,524 A | 5/2000 | Byerly et al. |
| 5,835,899 | A | 11/1998 | Rose et al. | 6,070,150 A | 5/2000 | Remington et al. |
| 5,852,811 | A | 12/1998 | Atkins | 6,070,798 A | 6/2000 | Nethery |
| 5,852,812 | A | 12/1998 | Reeder | 6,073,104 A | 6/2000 | Field |
| 5,859,419 | A | 1/1999 | Wynn | 6,073,113 A | 6/2000 | Guinan |
| 5,864,609 | A | 1/1999 | Cross et al. | 6,076,072 A | 6/2000 | Libman |
| 5,870,456 | A | 2/1999 | Rogers | 6,078,907 A | 6/2000 | Lamm |
| 5,870,721 | A | 2/1999 | Norris | 6,081,790 A | 6/2000 | Rosen |
| 5,870,723 | A | 2/1999 | Pare | 6,085,168 A | 7/2000 | Mori et al. |
| 5,870,725 | A | 2/1999 | Bellinger et al. | 6,088,683 A | 7/2000 | Jalili |
| 5,873,072 | A | 2/1999 | Kight | 6,088,685 A | 7/2000 | Kiron et al. |
| 5,878,141 | A | 3/1999 | Daly et al. | 6,088,686 A | 7/2000 | Walker et al. |
| 5,883,377 | A | 3/1999 | Chapin, Jr. | 6,092,056 A | 7/2000 | Tull, Jr. et al. |
| 5,884,288 | A | 3/1999 | Chang | 6,092,057 A | 7/2000 | Zimmerman et al. |
| 5,884,290 | A | 3/1999 | Smorodinsky et al. | 6,098,053 A | 8/2000 | Slater |
| 5,897,625 | A | 4/1999 | Gustin | 6,098,070 A | 8/2000 | Maxwell |
| 5,898,157 | A | 4/1999 | Mangili et al. | 6,101,479 A | 8/2000 | Shaw |
| 5,903,881 | A | 5/1999 | Schrader | 6,105,007 A | 8/2000 | Norris |
| 5,907,142 | A | 5/1999 | Kelsey | 6,105,011 A | 8/2000 | Morrison, Jr. |
| 5,910,896 | A | 6/1999 | Hahn-Carlson | 6,108,639 A | 8/2000 | Walker et al. |
| 5,910,988 | A | 6/1999 | Ballard | 6,110,044 A | 8/2000 | Stern |
| 5,915,246 | A | 6/1999 | Patterson et al. | 6,111,858 A | 8/2000 | Greaves et al. |
| 5,917,965 | A | 6/1999 | Cahill et al. | 6,115,690 A | 9/2000 | Wong |
| 5,920,847 | A | 7/1999 | Kolling et al. | 6,119,106 A | 9/2000 | Mersky et al. |
| 5,930,778 | A | 7/1999 | Geer | 6,119,107 A | 9/2000 | Polk |
| 5,940,811 | A | 8/1999 | Norris | 6,125,354 A | 9/2000 | MacFarlane et al. |
| 5,940,844 | A | 8/1999 | Cahill et al. | 6,128,599 A | 10/2000 | Walker et al. |
| 5,943,656 | A | 8/1999 | Crooks | 6,128,602 A | 10/2000 | Northington et al. |
| 5,945,653 | A | 8/1999 | Walker et al. | 6,128,603 A | 10/2000 | Dent et al. |
| 5,949,044 | A | 9/1999 | Walker et al. | 6,129,273 A | 10/2000 | Shah |
| 5,950,174 | A | 9/1999 | Brendzel | 6,138,118 A | 10/2000 | Koppstein et al. |
| 5,956,700 | A | 9/1999 | Landry | 6,138,917 A | 10/2000 | Chapin, Jr. |
| 5,960,411 | A | 9/1999 | Hartman et al. | 6,141,666 A | 10/2000 | Tobin |
| 5,963,659 | A | 10/1999 | Cahill et al. | 6,144,946 A | 11/2000 | Iwamura |
| 5,963,925 | A | 10/1999 | Kolling et al. | 6,148,293 A | 11/2000 | King |
| 5,966,698 | A | 10/1999 | Pollin | 6,149,055 A | 11/2000 | Gatto |
| 5,970,475 | A | 10/1999 | Barnes et al. | 6,149,056 A | 11/2000 | Stinson et al. |
| 5,978,780 | A | 11/1999 | Watson | 6,173,272 B1 | 1/2001 | Thomas et al. |
| 5,987,434 | A | 11/1999 | Libman | 6,181,837 B1 | 1/2001 | Cahill et al. |
| 5,987,435 | A | 11/1999 | Weiss et al. | 6,185,542 B1 | 2/2001 | Moran et al. |
| 5,987,436 | A | 11/1999 | Halbrook | 6,185,544 B1 | 2/2001 | Sakamoto et al. |
| 5,987,439 | A | 11/1999 | Gustin | 6,188,309 B1 | 2/2001 | Levine |
| 5,991,749 | A | 11/1999 | Morrill, Jr. | 6,202,054 B1 | 3/2001 | Lawlor et al. |
| 5,991,750 | A | 11/1999 | Watson | 6,205,433 B1 | 3/2001 | Boesch et al. |
| 6,000,832 | A | 12/1999 | Franklin et al. | 6,213,391 B1 | 4/2001 | Lewis |
| 6,002,767 | A | 12/1999 | Kramer | 6,223,168 B1 | 4/2001 | McGurl et al. |
| 6,003,762 | A | 12/1999 | Hayashida | 6,227,447 B1 | 5/2001 | Campisano |
| 6,006,205 | A | 12/1999 | Loeb et al. | 6,233,565 B1 | 5/2001 | Lewis et al. |
| 6,006,208 | A | 12/1999 | Forst et al. | 6,233,566 B1 | 5/2001 | Leving |
| 6,009,442 | A | 12/1999 | Chen et al. | 6,236,972 B1 * | 5/2001 | Shkedy ........................ 705/26.1 |
| 6,014,636 | A | 1/2000 | Reeder | 6,240,444 B1 | 5/2001 | Fin et al. |
| 6,016,482 | A | 1/2000 | Molinari et al. | 6,243,689 B1 | 6/2001 | Norton |
| 6,016,484 | A | 1/2000 | Williams et al. | 6,267,292 B1 | 7/2001 | Walker et al. |
| 6,018,718 | A | 1/2000 | Walker et al. | 6,278,981 B1 | 8/2001 | Dembo et al. |
| 6,026,388 | A | 2/2000 | Liddy et al. | 6,289,322 B1 | 9/2001 | Kitchen et al. |
| 6,029,139 | A | 2/2000 | Cunningham et al. | 6,292,789 B1 | 9/2001 | Schutzer |
| 6,029,153 | A | 2/2000 | Bauchner et al. | 6,301,379 B1 | 10/2001 | Thompson et al. |
| 6,032,133 | A | 2/2000 | Hilt et al. | 6,301,567 B1 | 10/2001 | Leong et al. |
| 6,032,134 | A | 2/2000 | Weissman | 6,304,858 B1 | 10/2001 | Mosler et al. |
| 6,032,136 | A | 2/2000 | Brake, Jr. et al. | 6,305,603 B1 | 10/2001 | Grunbok, Jr. et al. |
| 6,032,137 | A | 2/2000 | Hallard | 6,308,887 B1 | 10/2001 | Korman et al. |
| 6,035,281 | A | 3/2000 | Crosskey et al. | 6,321,212 B1 | 11/2001 | Lange |
| 6,035,285 | A | 3/2000 | Schlect et al. | 6,324,524 B1 | 11/2001 | Lent et al. |
| 6,035,287 | A | 3/2000 | Stallaert et al. | 6,327,575 B1 | 12/2001 | Katz |
| 6,036,099 | A | 3/2000 | Leighton | 6,336,103 B1 * | 1/2002 | Baker ........................ 705/36 R |
| 6,038,553 | A | 3/2000 | Hyde, Jr. | 6,338,047 B1 | 1/2002 | Wallman |

| | | |
|---|---|---|
| 6,338,049 B1 | 1/2002 | Walker et al. |
| 6,341,724 B2 | 1/2002 | Campisano |
| 6,343,279 B1 | 1/2002 | Bissonette et al. |
| 6,347,307 B1 | 2/2002 | Sandhu et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Bishop et al. |
| 7,546,272 B2 | 6/2009 | Loy |
| 7,587,363 B2 | 9/2009 | Cataline et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnett, Jr. |
| 2001/0034663 A1 | 10/2001 | Teveler et al. |
| 2001/0037300 A1 | 11/2001 | Miyazaki et al. |
| 2001/0037309 A1 | 11/2001 | St. Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Atognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138390 A1* | 9/2002 | May .............................. 705/37 |
| 2002/0138398 A1 | 9/2002 | Kalin et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |

| | | |
|---|---|---|
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0116024 A1 | 6/2005 | Beenau et al. |
| 2005/0144059 A1 | 6/2005 | Schuessler |
| 2005/0171898 A1 | 8/2005 | Bishop |
| 2005/0177480 A1 | 8/2005 | Huang |
| 2005/0209954 A1 | 9/2005 | Asher et al. |
| 2005/0228751 A1 | 10/2005 | Keown et al. |
| 2005/0261955 A1 | 11/2005 | Humble et al. |
| 2006/0036553 A1 | 2/2006 | Gupta et al. |
| 2006/0041540 A1 | 2/2006 | Shannon et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0193008 A1 | 8/2008 | Mount et al. |
| 2009/0043651 A1 | 2/2009 | Schwarz |

FOREIGN PATENT DOCUMENTS

| | | |
|---|---|---|
| EP | 0665486 | 8/1995 |
| EP | 1014318 | 6/2000 |
| JP | 2001-266039 | 9/2001 |
| JP | 2002-024618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2007-088822 | 4/2007 |
| WO | 91/16691 | 10/1991 |
| WO | 93/08545 | 4/1993 |
| WO | 94/28497 | 12/1994 |
| WO | 96/08783 | 3/1996 |
| WO | 96/12242 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 99/49404 | 9/1999 |
| WO | 00/18060 | 3/2000 |
| WO | 00/39979 | 7/2000 |
| WO | 01/75730 | 10/2001 |
| WO | 02/063432 | 8/2002 |
| WO | 2004/079603 | 9/2004 |

OTHER PUBLICATIONS

Andersen Consulting, Image-Based Transaction Processing: The Banking Industry's Challenge for the 1990s and Beyond (1989).
Andrew Gluck, Creating a global cash-management game plan, Bank Systems & Tech., Feb. 1997, at 28.
Andrew Reinbach, Chase steps up treasury system, Bank Systems & Tech., Nov. 1995, at 29.
Angela Maher & Jeffrey Troutman, PNC Bank Treasury Management, Payor's Prescription for Painless Migration to Receipt of Electronic Healthcare Payments and Remittance Advices (Dec. 2001).
Angela Maher & Jeffrey Troutman, PNC Bank Treasury Management, Provider's Prescription for Painless Migration to Receipt of Electronic Healthcare Payments and Remittance Advices (Dec. 2001).
Ann Keeton, Bank of America Completes Its Rollout of 'Paperless' Processing of Payments, Wall St. J., Nov. 1, 1999, at B13.
BancTec Selects Alchemy CD-Based Archival Solution for Remittance Processing System, Bus. Wire, May 6, 1998.
Bank of America Provides Nationwide Lockbox Services, Press Release, Oct. 20, 1999.
Bridget Malone, Internet Billing: Building a Secure Global Market, Electronic Commerce World, Jan. 2001, at 46.
Caere introduces the Model 1800 document remittance processor, Bus. Wire, Oct. 19, 1995.
CardFlash, Daily Payment Card News, Sep. 23, 2004.
CES/NaBanco introduces stored value card technology; Blockbuster Video is first merchant partner, Bus. Wire, Jan. 15, 1996.
Chapter Reports: Texas Chapter, Work Process Improvement Today, Apr. 1998.
Chase Image-Enables NY Wholesale Lockbox Facility with VICOR Technology, Press Release, Aug. 31, 1999.
Chase Manhattan introduces new FEDI payables product, Cash Mgmt. News, May 1995.
Chase offers image lockbox for Europe, Bank Systems & Tech., Aug. 1997, at 37.
Chasing the Global Trend, Cash Mgmt. News, Dec. 1995, at 8.
Christy Tauhert, Lock Box Solutions Reengineer Payment, Insurance & Tech., Aug. 1996, at 22.
Cindy Jensen, U.S. Bank Effectively Manages Complexity, Today, May/Jun. 2006.
Council for Electronic Billing and Payment, Business-to-Business EIPP: Presentment Models and Payment Options Council One (Jan. 2001).
Council for Electronic Billing and Payment, Business-to-Business EIPP: Presentment Models and Payment Options Part Two (Jan. 2001).
Crestar to Introduce New Advanced Cash Management System Based on IA Corp. Software, Bus. Wire, Oct. 28, 1996.
Dieter Wackerow, MQSeries Enterprise Application Integration Center, MQ Series Primer, Oct. 1999.
DMP and IMR Partner to Develop Electronic Archiving Solution for Wholesale Lockboxes and Remittance Processing, Bus. Wire, Mar. 24, 1998.
Douglas Armstrong, Norwest eases difficulty of interstate banking Bank's customers may use the same account number at any branch, Milwaukee J. Sentinel, Oct. 12, 1995, at 2.
Du Pont's Electronic Payments System, Corporate EFT Report, Jan. 11, 1989.
Elena Malykhina, Cell Phone Software Formats Check for Online Banking, InformationWeek, Jan. 24, 2008.
Erica Goode, on Profit, Loss and the Mysteries of the Mind, N.Y. Times, Nov. 5, 2002.

Fidelity Helps Fund Sellers Trim the Taxes They'll Owe, Wall St J., Nov. 7, 2002.
First Data markets stored-value cards, Cards Int'l, Jan. 30, 1996, at 5.
Frank J. Derfler, Jr. & Les Freed, How Networks Work 144-51 (2003).
Get ready for electronic commerce, ABA Banking J., Jun. 1995, at 47.
Gordon Platt, Online billing & payments: Technology Providers Multiply, Global Fin., Apr. 1, 2001.
Gregory Zuckerman, The Hedge-Fund Craze, Wall St. J., Jun. 12, 2002.
Henry Urrows & Elizabeth Urrows, Automated imaging in financial services, 11 Document Image Automation 259 (Sep.-Oct. 1991).
IA announced installation at QuestPoint of first client/server cash management system with check image storage compatible with IBM, NCR and Unisys, Bus. Wire, May 29, 1997.
IA Corp. Announces New CheckVision Products, Bus. Wire, Apr. 1, 1996.
IA Corp. shows complex transaction processing software WorkVision at AIIM, Bus. Wire, Apr. 14, 1997.
IA Corp. Wins Contract With Comercia to Install the First Digital All Items Archive, Bus. Wire, Jan. 9, 1997.
IA Corporation Becomes a Major Player in Image-Based Cash Management Solutions, Bus. Wire, Nov. 24, 1995.
IA Presents New Advanced Cash Management Software at TMA to Link Banks and Their Corporate Customers, Bus. Wire, Nov. 18, 1996.
Ian McDonald, The Stars in the Sky Flicker, and Fund Stars Do the Same, Wall St. J., Jan. 15, 2003.
IA's RemitVision adapted by Harris Bank for CD-ROM and Online Customer Viewing of Check and Remittance Documents, Bus. Wire, May 28, 1996.
In Brief: Wachovia-InteliData Deal, Am. Banker, May 7, 2002.
Initial Launch to 200 Credit Unions, USA Today, Jun. 27, 2002.
Intelidata Technologies Corporation, Form 10-K for fiscal year ended Dec. 31, 2001.
J.D. Carreker, Electronic Check Presentment: Capturing new technology, Banking Mgmt., Mar./Apr. 1995, at 32.
J.P. Buckley et al., Processing noisy structured textual data using a fuzzy matching approach: application to postal address errors, 4 Soft Computing 195 (2000).
Jeetu Patel & Joe Fenner, E-Billing Moves Into B2B, Imaging & Document Solutions, Jan. 2001, at p. 44.
Jeetu Patel, B-to-B E-Billing Heats Up—Business-to-business electronic billing is more complex than the business-to-consumer model, but the potential payoffs are bigger, InformationWeek, Oct. 23, 2000.
John C. Bogle, Founder and Former Chairman, The Vanguard Group, Remarks to the '40 Act Institute of Practising Law Institute: Mutual Funds at the Millennium—Fund Directors and Fund Myths (May 15, 2000).
John Shannon, New lockbox platform due out at NationsBank, Bank Systems & Tech., Feb. 1998, at 38.
Jonathan Clements, Harsh Truth: Your Investments Likely Won't Make Any Money, Wall St. J., Nov. 27, 2002.
Keith Lamond, Credit Card Transactions Real World and Online, available at, http://www.virtualschool.edu/mon/ElectronicProperty/klamond/credit_card.htm (last visited Jul. 8, 2005).
Kristen French, Investors Worry CheckFree Being Chased from its Own Game, TheStreet.com, Jun. 20, 2001.
Liz Moyer, Bank of Montreal to Install Imaging System by Unisys for Retail Lockbox Services, Am. Banker, Oct. 22, 1996, at 19.
Liz Moyer, KeyCorp Joins Trend to Check Imaging Lockbox, Am. Banker, Aug. 23, 1996.
M. Williams, Friis, Goodbye to paper?, ABA Banking J., Mar. 1989, at 61.
Mark Arend, Bank applications fuel optical storage market, ABA Banking J., Oct. 1991, at 77.

Melinda Norris, First Data Unit Develops Blockbuster Cash Card, Omaha World Herald, Jan. 19, 1996, at 16.
NationsBank rolls out first wholesale lockbox imaging, Potomac, Aug. 3, 1995, at 1.
NCR introduces 7780 item processing system, Bus. Wire, Mar. 11, 1992.
Newsbyte, Visa & Carnegie Mellon Plan Online Payment Scheme, 1995 WL 2205732, Feb. 15, 1995.
Nokia Announces the World's First NFC Enabled Mobile Product for Contactless Payment and Ticketing, PR Newswire, Feb. 9, 2005.
Offer: Book Yourself Free Cassettes, Birmingham Post, Mar. 25, 2000, at 16.
Operating in a multi-currency environment, Aslamoney, Oct. 1995, at 6.
Patricia A. Murphy, E-Billing: New Age Electronic Data; Interchange or Something Better?, Bank Tech. News, Jul. 2000, at 43.
Paul Williams, IBM UK Laboratories Ltd., IBM MQSeries Commercial Messaging, ACM SIGICE Bulletin, Apr. 1995.
Payment Data Systems files patent on debit card payment solution, Am. City Business J., Mar. 5, 2004.
PNC Bank Add Chicago to National Lockbox Network, PR Newswire, Nov. 5, 1997.
Priya Malhotra, Clearing House Enumerates e-Payment IIIs, Am Banker, Aug. 13, 2002.
Richard J. Maturi, Personal Finance; When you need to send cash in a flash, N.Y. Times, Sep. 25, 1988, at A7.
Robert M. Hunt, Federal Reserve Bank of Philadelphia, Working Paper No. 03-10: An Introduction to the Economics of Payment Card Networks (Jun. 2003).
Robert M. Hunt, An Introduction to the Economics of Payment Card Networks, Rev. Network Econ., Jun. 2003, at 80.
Scott Leibs, Internet Billing Gets Its Due, CFO, Feb. 1, 2001, at 30.
Shawmut Bank Provides Lockbox Customers Real-Time, On-Line Electronic Exception Processing, Bus. Wire, Jan. 9, 1996.
Sherree DeCovney, Net scope, Banking Tech., May 1997, at 28.
Simultaneous Image Capture, Bank News, Oct. 1996, at 10.
State of Minnesota using AT&T imaging solution to reengineer sales tax paying process, Bus. Wire, Apr. 18, 1994.
Stephen M. Matyas, Digital Signatures—An Overview, 3 Computer Networks 87 (1979).
Steve Bills, Chase Pact Done, What's Next for Web Vendors?, Am. Banker, Jun. 3, 2002, at 23.
Steve Forbes, Fact and Comment, Forbes, Sep. 30, 2002, at 33.
Steven Marjanovic, Corporate Services: Chase Gears Up Global Payments System Series: 16, Am. Banker, Sep. 11, 1995, at 41.
Steven Marjanovic, NationsBank offers lockbox imaging, Am. Banker, Jul. 3, 1995, at 20.
Systems spell change for foreign exchange, Global Investor, Nov. 1996, at 18.
Terrie Miller & Henry Yan, When custody governs, Benefits Canada, Feb. 1998, at 33.
The payments system gets a new image, ABA Banking J., Mar. 1990, at 84.
Thomas P. Fitch, Image Technology brings lockbox breakthroughs, Corp. Cashflow Magazine, Sep. 1995, at 16.
U.S. Appl. No. 60/133,577, filed May 11, 1999.
Valerie Block, Blockbuster Running Test of a Stored Value Card, Am. Banker, Sep. 1, 1995.
Wausau Financial Systems' ImageRPS and OPEX interface a perfect math, Work Process Improvement Today, Dec. 1997.
Wells Fargo Rolls out Nationwide Lockbox Check Conversion, PR Newswire, Apr. 22, 2003.
Wendy S. Mead, Two Banks' Imaging Deals Target Fee Revenue Increases, Am. Banker, May 9, 1997, at 11.
Wholesale lockbox imaging, ABA Banking J., Feb. 1, 1993.

* cited by examiner

BILLING WORKFLOW SYSTEM FOR CREDITING CHARGES TO ENTITIES CREATING DERIVATIVES EXPOSURE

CROSS REFERENCE TO RELATED APPLICATIONS

This application is a continuation of prior U.S. patent application Ser. No. 10/774,357, titled "Billing Workflow System for Crediting Charges to Entities Creating Derivatives Exposure", filed on Feb. 6, 2004, which in turn claims the benefit of U.S. Provisional Application Ser. No. 60/529,498, titled "Billing Workflow System For Crediting Charges to Entities Creating Derivatives Exposure", filed on Dec. 15, 2003. The entire disclosures of U.S. patent application Ser. No. 10/774,357 and U.S. Provisional Application No. 60/529,498 are hereby incorporated herein by reference.

FIELD OF THE INVENTION

The present invention relates generally to automated billing systems, and, more particularly, to an automated billing workflow system for crediting charges to entities creating derivatives exposure.

BACKGROUND OF THE INVENTION

Although profitable, trading in derivatives involves some degree of risk. For example, traders may act as market makers for certain derivatives and, in accumulating inventory, develop positions that result in market risk. The main risk is represented by the possibility of counterparty default, the estimation of which, on a per deal basis, is called the credit charge or bill (on the day of deal inception) and credit reserve movement (on following days, up to the expiration date of the deal).

Various analytical models exist that allow investment banks to estimate the risk associated with particular derivatives. Although it is possible to make estimates as to the risk and calculate an amount of reserve to set aside, one of the problems has been that financial institutions fail to appropriately credit an amount of the exposure to the actual business unit and trade creating the risk.

SUMMARY OF THE INVENTION

An automated billing workflow system receives reserve information associated with derivatives trades. The automated billing workflow system interacts with an Accounting System to make appropriate Profit and Loss (P&L) entries for reserve amounts. The reserve amounts are then billed to the business units that actually created the derivatives exposure.

The invention employs a plurality of Workflow Queues. As an item makes it way through the billing workflow, it may he slotted in one or more of these queues where further action will take place. This arrangement allows various employees to review the charges to determine whether they are appropriate, and to make adjustments before the amount is actually billed.

These and other aspects, features and advantages of the present invention will become apparent from the following detailed description of preferred embodiments, which is to be read in connection with the accompanying drawings.

DESCRIPTION OF PREFERRED EMBODIMENTS

Figure 1:
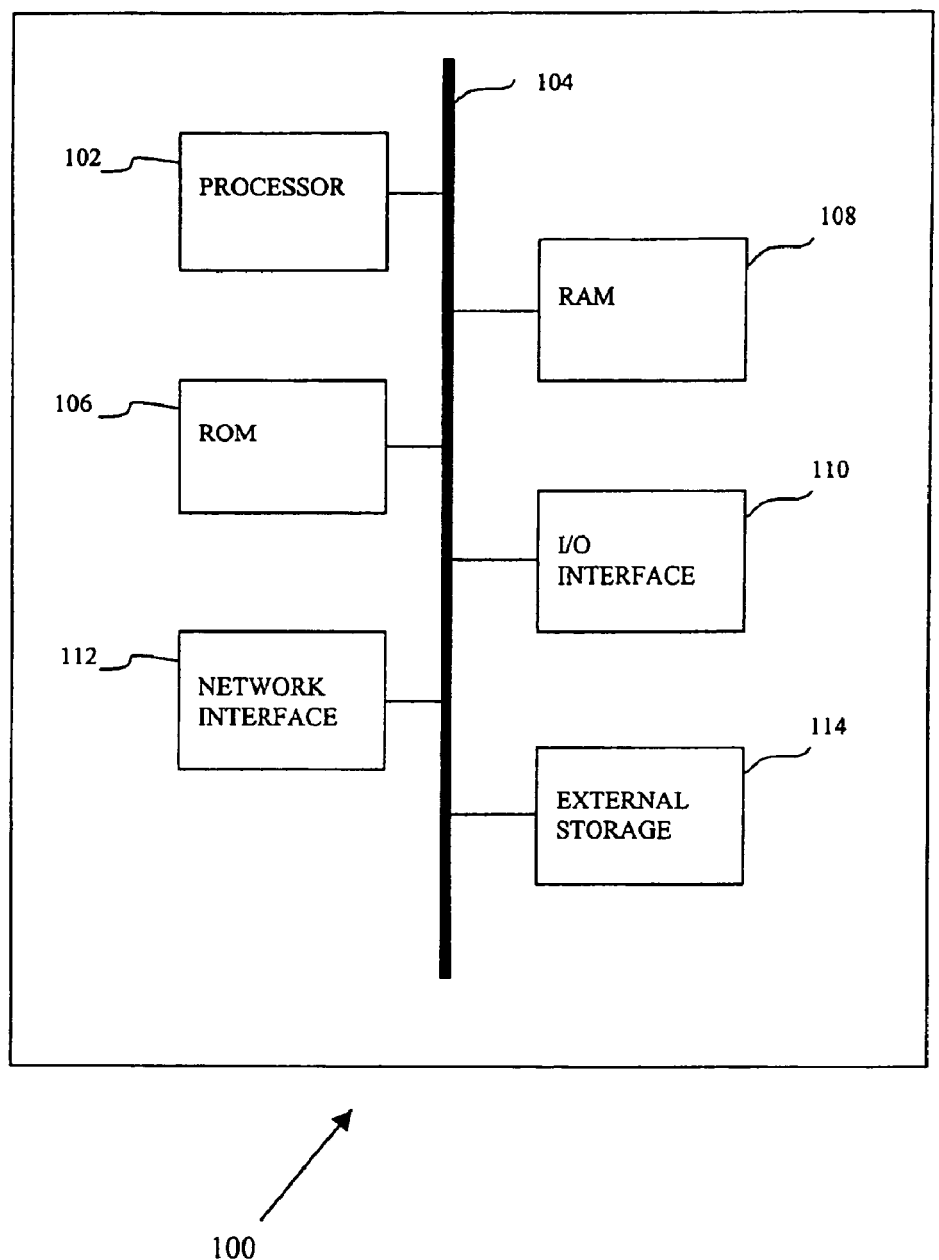
FIG. 1 is a block diagram of a computer processing system to which the present invention may be applied.

As depicted in FIG. 1, a computer system 100 includes at least one processor (hereinafter processor) 102 operatively coupled to other components via a system bus 104. A read-only memory (RUM) 106, a random access memory (RAM) 108, an I/O interface 110, a network interface 112, and external storage 114 are operatively coupled to the system bus 104. Although not shown, it is to be understood that the RAM 108 includes operating system software and software of the invention. Representative operating systems include Microsoft WINDOWS, LINUX and UNIX.

Various peripheral devices such as a display device, a disk storage device (e.g., a magnetic or optical disk storage device), a keyboard, and a mouse, may be operatively coupled to the system bus 104 by the I/O interface 110 or the network interface 112.

The computer system 100 may be a standalone system or he linked to a network via the network interface 112. The network interface 112 may be a hard-wired interface. However, in various exemplary embodiments, the network interface 112 can include any device suitable to transmit information to and from another device, such as a universal asynchronous receiver/transmitter (UART), a parallel digital interface, a software interface or any combination of known or later developed software and hardware. The network interface may be linked to various types of networks, including a local area network (LAN), a wide area network (WAN), an intranet, a virtual private network (VPN), and the Internet.

The external storage 114 may be implemented using a database management system (DBMS) managed by the processor 102 and residing on a memory such as a hard disk. However, it should be appreciated that the external storage 114 may be implemented on one or more additional computer systems.

Those skilled in the art will appreciate that other alternative computing environments may be used without departing from the spirit and scope of the present invention.

Figure 2:
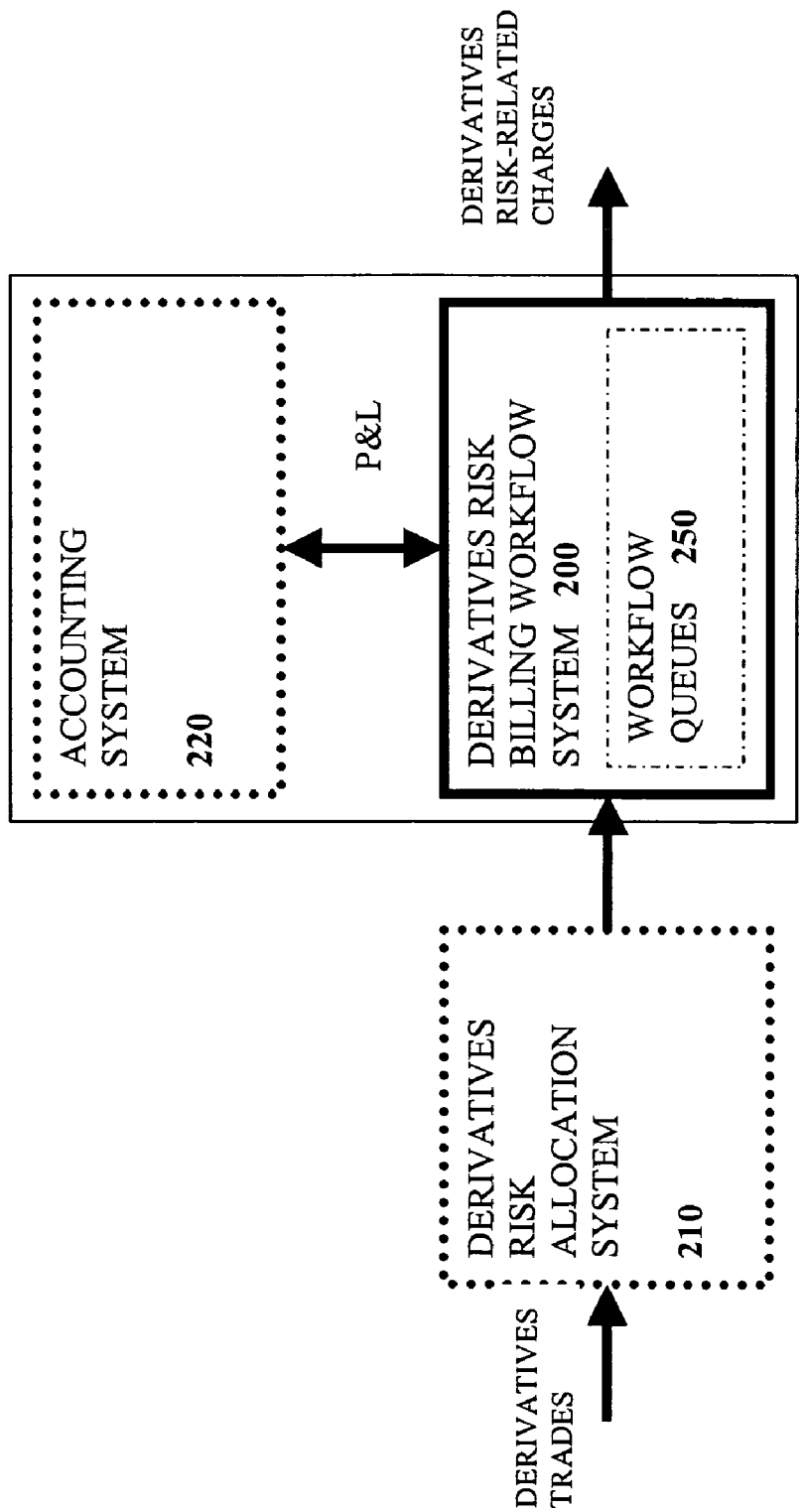
FIG. 2 is a block diagram showing an exemplary billing workflow for billing credit charges to entities executing derivatives.

FIG. 2 illustrates an exemplary system for billing credit charges to entities trading derivatives. As depicted, a Derivatives Risk Allocation System 210 receives derivative trade information and calculates a credit valuation adjustment (CVA) amount for the trade. In general, the CVA is based on an estimation of exposure to counterparty default. This estimation of exposure to counterparty default is calculated using a complex Monte Carlo methodology modeled over the projected life of the trade. The Derivatives Risk Billing Workflow System 200 receives the calculated CVA, and can interact with an Accounting System 220 in order to make appropriate Profit and Loss (P&L) entries for the CVA. The Accounting System 220 is integrated with the Derivatives Risk Billing Workflow System 200. (Alternatively, the Accounting System 220 could exist as a separate system). The CVA amounts are billed to the business units which actually caused the risk and appear on billing reports.

Figure 3:
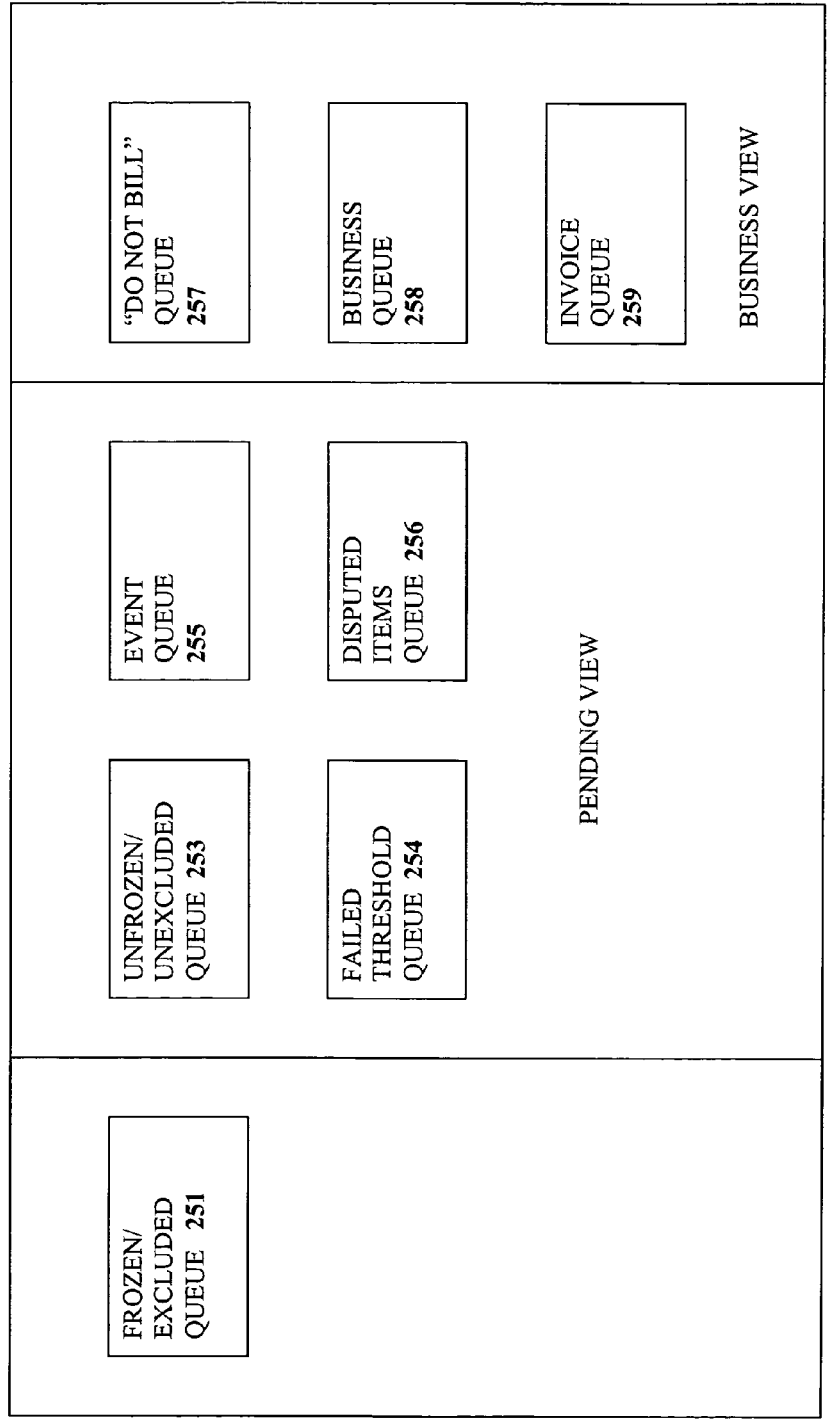
FIG. 3 illustrates various exemplary workflow queues that may be used in conjunction with the system shown in FIG. 2.

Advantageously, the Derivatives Risk Billing Workflow System 200 includes a plurality of Workflow Queues 250 (shown in detail in FIG. 3) for holding an item for further review (or other purposes). As an item makes it way through the billing workflow, it may be slotted in one or more of the Workflow Queues 250 where further action will take place. This arrangement allows various employees to review credit charges to determine whether they are appropriate, and to make adjustments before the CVA is actually billed. Also, as mentioned, accounting adjustments for Profit and Loss (P&L) can also be automatically made.

As discussed above, once a derivatives trade is executed, the relative risk of the trade to the institution can be assessed, and an amount of risk-related reserve determined. For various reasons, this CVA may not be the actual amount billed. For example, the amount calculated may be disputed by a client or it may be deemed as being invalid. The present invention allows for additional levels of review, as well as for additional checks to be made before the bill is actually sent out.

As an initial matter, trade information can be checked to determine whether the trade is "frozen" or "excluded". In general, a trade will be considered frozen or excluded based on its Universal Counterparty Number (UCN). The UCN can represent an individual legal entity, commercial grouping or commercial entity. Frozen trades can occur for many reasons (e.g., certain internal counter parties, temporary data quality issues). Counter parties can be marked as excluded for various reasons (e.g. counter party risk managed in a more specialized book).

If it is determined that the trade is "frozen" or "excluded", the calculated CVA will be held in the Frozen/Excluded Queue 251. The trade will be held until its UCN becomes unfrozen or removed from the excluded list. In that case, the trade will be moved to the Unfrozen/UnExcluded Queue 253. As with the other queues, this Unfrozen/UnExcluded Queue 253 is intended to be "viewable". That is, the contents of the queue may be browsed, or otherwise outputted, to appropriate personnel. For example, a user in the Accounting Department may use an on-line screen to examine the contents of the viewable queue. The user may adjust the content of the queue, or to take other specified action.

Assuming that the trade is not "frozen" or "excluded", the CVA is assessed to determine whether it exceeds a predefined threshold amount. Trades that exceed the predefined threshold amount will be routed to a Failed Threshold Queue 254. Items in the Failed Threshold Queue 254 will be examined to determine whether the credit amount generated is indeed invalid. If the credit amount is determined to be valid, the credit amount will flow to the Business Queue 258. As will be discussed in more detail, items in the Business Queue 258 will eventually be routed to an Invoice Queue 259, and then appear on the billing statement. If the credit amount is not deemed valid, however, the amount will be reversed and forwarded to the Do Not Bill Queue 257. P&L for items in the Failed Threshold Queue 254 will be posted as "pending" until released to the Business Queue 258 or the Do Not Bill Queue 257. A "pending" indicator can be associated with these trades, for example.

Trades that have an event log that has been triggered will appear in an Event Queue 255 for analysis. The trigger can be a specified date or an event associated with a trader (e.g., an edit or unwind). A diary system will preferably be maintained to prompt users to do and record certain tasks, and to remind users of overdue tasks. For example, the diary might remind certain users that a trade has been moved to a queue for review by a specific department, and, if they have not reviewed this matter after a certain number of days, an email reminder would be sent.

Items that are being disputed can be sent to the Disputed Items Queue 256. For example, if a business unit does not agree with a particular charge in the Business Queue 258, the business unit can flag the item (using an on-line screen, for example), and add a comment including a reason for the disagreement. The flagged item can be reviewed to determine whether the item should be routed to the Disputed Items Queue 256 for further review. P&L for items in the Disputed Items Queue 256 will be reversed and posted as "pending" until released to the Business Queue 258 or the "Do Not Bill" Queue 257. The pending" indicator can also be used for trades in the Disputed Items Queue 256.

Items will flow to the "Do Not Bill Queue" 257 when the amount will not be charged. Trades can be sent to "Do Not Bill Queue" 257 from the Unfrozen/Unexcluded Queue 253, the Failed Threshold Queue 254, the Disputed items Queue 256, or the Business Queue 258. Any pending P&L will be reversed once items are designated "Do Not Bill".

Contents of the Business Queue 258 may be viewed using any suitable means, such as, for example, a screen including a drop-down menu where each business unit is able to retrieve only items related to its particular business. Trades that pass the threshold check will generally flow directly to the Business Queue 258. At that point, P&L will be directly posted. Trades that have been in the Unfrozen/Unexcluded Queue 253, the Failed Threshold Queue 254, or the Disputed hems Queue 256 can be sent to the Business Queue 258 after review, and P&L will be posted for these items. Trades that are in the Business Queue 258 can also be moved to the "Do Not Bill" Queue 257. This will cause P&L to be reversed and show a zero charge amount.

As mentioned, once items reach the Business Queue 258, the business units will be able to review them. If a business unit disagrees with a charge, the business unit will have the ability to flag that item along with a comment about the reason for the dispute. Flagged items will he reviewed to decide whether to send the trade to the Disputed items Queue 256 for further review. P&L will be reversed for these deals and classified as pending. If the dispute is deemed invalid, an explanation may be associated with the item for the business unit to review. These trades will flow to the Invoice Queue 259.

Items that have entered the Business Queue 258 will be sent to the Invoice Queue 259 at the end of the billing period (except for those items that are sent back to the Disputed Items Queue 256 for further review). Preferably, invoices will be arranged by business unit, reflecting the following column screen headers:

1. Total Gross Credit Amount
2. Adjustments
3. Net Credit Amount
4. Post-billing adjustment
5. Proxy Re-balancing
6. Collateral/Netting rebates/charges
7. Miscellaneous adjustments
8. Total billed amount. Preferably, clicking on the Total Billed Amount column will provide details relating to that trade.
9. Editable Entry for the business unit to enter an expected amount to pay/receive.
10. Editable Entry for Accounting/Control to enter the amount actually received/paid.
11. Column/Field reflecting an outstanding amount (i.e., difference between the total bill amount and the amount that Accounting/Control indicated was actually received/paid).
12. Invoice Number.

Of course, the invoice may instead, or additionally, be outputted as a primed report.

It is to be appreciated that the above describes a somewhat simplified billing system. The system described above is meant to be illustrative of various embodiments of the present invention.

The invention will be clarified by the following examples.

EXAMPLES

1. Trade on Frozen List

In this case, the system recognizes the trade as having a frozen UCN. The trade is then routed to the Frozen/Excluded Queue 251 where it remains until "unfrozen". The trade does not impact P&L and does not appear in the month's billing. Once the UCN is unfrozen, all bills generated during the frozen period will be reviewed to determine whether charges should be applied to the business unit. If the items that are being billed are items that originated in a prior month, they can be billed as "Post Bill Adjustments" in the current month.

2. Credit Valuation Amount Exceeds Threshold

The CVA associated with a trade will be checked to determine whether it exceeds a predefined threshold amount (e.g., $100,000). In this case, the trade will be routed to the Failed Threshold Queue 254. The charge will then be analyzed to determine whether it is valid or not. The credit amount can either be forwarded as billed, adjusted, or zeroed out. P&L will be posted as pending until the item is routed to the Business Queue 258 or the "Do Not Bill Queue 257.

3. Invoiced Trade From Prior Month is Contested by Business Unit

Let us assume that the trade resided in the invoice Queue 259 and the business unit decided to make an adjustment. If it is agreed that the adjustment should be made, the trade will be moved to the Disputed Items Queue 256. This will cause P&L to be reversed for the month it was "earned" and classified as a "Post-Bill adjustment." This P&L amount will be pending while the item remains in the Disputed Items Queue 256. Once the adjustment is made, the trade will be sent back to the Business Queue 258, posting the new amount. The net between the reversal and the new amount will be reflected in the "P&L-Post-Bill Adjustment" column and recognized in the current month.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer system for allocating charges related to derivatives trading to a business unit in a business organization, comprising:
   a computer memory configured to store reserve amount information based on an exposure associated with a derivative trade; and
   a risk allocation computer operatively coupled to the computer memory, the risk allocation computer configured to calculate a credit valuation adjustment amount associated with a derivative trade; and
   a workflow queue computer operatively coupled to the risk allocation computer, the workflow queue computer configured to hold the credit valuation adjustment amount for further review.

2. The system of claim 1, wherein the workflow queue computer comprises a frozen/excluded queue configured to hold the credit valuation adjustment amount if the derivative trade is on an excluded list.

3. The system of claim 1, wherein the workflow queue computer comprises a failed threshold queue configured to assess whether the credit valuation adjustment amount exceeds a predefined threshold amount.

4. The system of claim 1, wherein the workflow queue computer comprises a business queue configured to provide access to the credit valuation adjustment amount to an individual associated with a business unit involved in the derivative trade.

5. The system of claim 1, wherein the workflow queue computer comprises an invoice queue configured to bill the credit valuation adjustment amount to a business unit involved in the derivative trade.

6. The system of claim 1, wherein the workflow queue computer comprises a disputed item queue configured to bill the credit valuation adjustment amount to a business unit involved in the derivative trade.

7. The system of claim 1, wherein the workflow queue computer comprises an event queue configured to store information relating to a derivative trade having an associated event.

8. The system of claim 1, wherein the workflow queue computer comprises a do not bill queue configured to receive a derivative trade for which the credit valuation adjustment amount is not charged to a business unit involved in the derivative trade.

9. A method for managing a credit valuation adjustment amount related to a derivative trade to a business unit in a business organization, comprising:
   receiving, by a computer processor, derivative trade information;
   calculating, by the computer processor, a credit valuation adjustment amount based on the derivative trade information; and
   providing, by the computer processor, the derivative trade information and credit valuation adjustment amount to at least one of a plurality of workflow queues configured to facilitate further review or processing of the derivative trade information and the credit valuation adjustment amount.

10. The method of claim 9, wherein the at least one of the plurality of work flow queues comprises a frozen,/excluded queue configured to hold the credit valuation adjustment amount if the derivative trade is on an excluded list.

11. The method of claim 9, wherein the at least one of the plurality of workflow queues comprises a failed threshold queue configured to assess whether the credit valuation adjustment amount exceeds a predefined threshold amount.

12. The method of claim 9, wherein the at least one of the plurality of work flow queues comprises a business queue configured to provide access to the credit valuation adjustment amount m an individual associated with a business unit involved in the derivative trade.

13. The method of claim 9, wherein, the at least one of the plurality, of workflow queues comprises an invoice queue configured to bill the credit valuation adjustment amount to a business unit involved in the derivative trade.

14. The method of claim 9, wherein the at least one of the plurality of workflow queues comprises a disputed item queue configured to bill the credit valuation adjustment amount to a business unit involved in the derivative trade.

15. The method of claim 9, wherein the at least one of the plurality of workflow queues comprises an event queue configured to store information relating to a derivative trade having an associated event.

16. The method of claim 9, wherein the at least one of the plurality of workflow queues comprises a do not bill queue: configured to receive a derivative trade for which the credit valuation adjustment amount is not charged to a business unit involved in the derivative trade.

17. A program storage device readable by a machine, tangibly embodying a program of instructions executable on the machine to perform method steps for crediting charges to entities creating derivatives exposure, the method steps comprising:
    receiving reserve information associated with a derivative;
    identifying an entity creating the derivative exposure; and
    generating billing information for the entity creating the derivative exposure.

\* \* \* \* \*